United States Patent
Kikuyama et al.

(10) Patent No.: US 6,514,474 B1
(45) Date of Patent: Feb. 4, 2003

(54) METHOD OF PURIFYING LITHIUM HEXAFLUOROSPHATE

(75) Inventors: Hirohisa Kikuyama, Osaka (JP); Toshirou Fukudome, Osaka (JP); Masahide Waki, Osaka (JP); Hirofumi Yazaki, Osaka (JP)

(73) Assignee: Stella Chemifa Kabushiki Kaisha, Osaka (JP)

( * ) Notice: Subject to any disclaimer, the term of this patent is extended or adjusted under 35 U.S.C. 154(b) by 0 days.

(21) Appl. No.: 09/600,231

(22) PCT Filed: Nov. 16, 1999

(86) PCT No.: PCT/JP99/06386

§ 371 (c)(1), (2), (4) Date: Sep. 5, 2000

(87) PCT Pub. No.: WO00/29324

PCT Pub. Date: May 25, 2000

(30) Foreign Application Priority Data

Nov. 17, 1998 (JP) .............................. 10-327319

(51) Int. Cl.$^7$ ............................................... C01B 25/10
(52) U.S. Cl. ....................................................... 423/301
(58) Field of Search .......................................... 423/301

(56) References Cited

U.S. PATENT DOCUMENTS 5,866,093 A * 2/1999 Belt et al. ................... 423/301

FOREIGN PATENT DOCUMENTS

| JP | 59081870 A | 5/1984 | ............ H01M/6/16 |
| JP | 298507 | * 10/1994 | |
| JP | 06298506 A | 10/1994 | ......... C01B/25/455 |
| JP | 10072207 A | 3/1998 | ......... C01B/25/455 |
| JP | 10092468 A | 4/1998 | ......... H01M/10/40 |
| JP | 11147705 A | 6/1999 | ......... C01B/25/455 |

* cited by examiner

*Primary Examiner*—Wayne A. Langel
(74) *Attorney, Agent, or Firm*—Randall J. Knuth

(57) ABSTRACT

A method of purifying lithium hexafluorosphate that allows to purify lithium hexafluorophosphate, useful as lithium secondary cell electrolyte, organic synthesis medium or the like, to an extremely high purity is provided. Lithium hexafluorophosphate containing harmful impurities such as oxyfluoride, lithium fluoride is purified by adding phosphoric chloride. The purification is performed in the presence of phosphoric chloride and hydrogen fluoride of the quantity equal or superior to the equivalent amount for reacting them, and then by converting lithium fluoride to lithium hexafluorophosphate with generated phosphor pentafluoride.

5 Claims, 2 Drawing Sheets

METHOD OF PURIFYING LITHIUM HEXAFLUOROSPHATE

TECHNICAL FIELD OF INVENTION

The present invention concerns a method of purifying lithium hexafluorosphate that allows to purify lithium hexafluorophosphate, useful as, for instance, lithium secondary cell electrolyte, organic synthesis medium or the like, to an extremely high purity.

PRIOR ART

Lithium hexafluorophosphate is usually synthesized in an insoluble medium such as hydrofluoric anhydride or organic medium; however it reacts with a trace of water existing in the medium, and generates oxyfluoride and lithium fluoride etc., then they are mixed into the product and contaminates the same. Besides, lithium hexafluorophosphate decomposes and equilibrates partially as shown in the following expression, when it is dissolved in hydrofluoric anhydride or organic medium.

$$LiPF_6 \leftrightarrow LiF + PF_5$$

This LiF is mixed into the product and becomes impurity.

As lithium hexafluorophosphate has an extremely high moisture absorption ability, even a trace of humidity in the atmosphere provokes hydrolysis to generate fluoric acid portion. In addition, lithium fluoride or lithium oxyfluorophosphate ($LiPO_xF_y$) is generated to cause impurity. If lithium hexafluorophosphate containing such impurities is used as lithium cell electrolyte, fluoric acid erodes into electrode material, and lithium fluoride becomes residue as it is insoluble to organic medium and requires filtration and removal, while lithium oxyfluorophosphate accelerates the decomposition of organic medium, and possibly increases inner voltage, lowers cell capacity, or inflames.

Conventionally, these impurities can be removed, by a method wherein lithium hexafluorophosphate is solved in an organic medium and impurities are removed by an ion exchange {exchanged} resin (Japanese Patent Laud-Open No. SHOU 59-87774) or a method for neutralizing in an organic medium (Japanese Patent Laid-Open No. SHOU 59-81870); however, as these methods solve once into an organic medium, increasing the production process and costs.

Moreover, a method for reacting and removing oxyfluorophosphate with fluoric gas (Japanese Patent Publication No. HEI 4-16406, Japanese Patent Publication No. HEI 4-16407) or a method for making hexafluorophosphate contact with a gas containing pentafluorophosphate (Japanese Patent Laid-Open No. HEI 6-29850) or the like involve danger in gas treatment and require special knowledge. Moreover, fluoric gas or phosphor pentafluoride to be used are required to be refined to a high purity, increasing cost and affecting considerably the product price.

Therefore, none of conventional method was not satisfactory.

It is an object of the present invention to provide a method of purifying lithium hexafluorosphate that allows to obtain high purify lithium hexafluorophosphate, by converting hydrogen fluoride, oxyfluoride, lithium fluoride or other impurities, generated in the course of production, handling or conservation of lithium hexafluorophosphate and mixed with the product, into lithium hexafluorophosphate.

DISCLOSURE OF THE INVENTION

The method of purifying lithium hexafluorosphate of the present invention is characterized by that the purification is performed by introducing phosphoric chloride and hydrogen fluoride of the quantity necessary for producing phosphor pentafluoride of the quantity more than necessary for converting rude lithium hexafluorophosphate and oxyfluoride in the raw material into lithium hexafluorophosphate, in the reaction system with brut lithium hexafluorophosphate and reacting them.

Effect

In the present invention, impurities such as hydrogen fluoride, oxyfluoride, lithium fluoride contained in lithium hexafluorophosphate are converted into lithium hexafluorophosphate by adding phosphoric chloride for the purification. At this moment, phosphoric chloride and hydrogen fluoride of equal or superior to the equivalent amount are introduced for reacting them.

At this moment, phosphoric chloride reacts with hydrogen fluoride to generate phosphor pentafluoride:

$$PCl_5 + 5HF \rightarrow PF_5 + 5HCl \tag{1}$$

The generated phosphor pentafluoride reacts respectively with oxyfluoride and lithium fluoride as follows to be converted into lithium hexafluorophosphate and purified.

$$LiPO_xF_y + PF_5 \rightarrow LiPF_6 + PO_xF_{y-1} \tag{2}$$

$$LiF + PF_5 \rightarrow LiPF_6 \tag{3}$$

The reaction shown by the formula (1) develops quantitatively at the room temperature and normal pressures. By-product hydrochloric gas is not involved into the reaction and discharged from the system without depositing to the product or remaining, because of high vapor pressure.

The ratio of phosphoric chloride to hydrogen fluoride is desirable that hydrogen fluoride be equal or superior to chemical equivalent amount; however, even if phosphoric chloride is in-excess and remains non-reacted, it can be removed by heating at an temperature equal or superior to 100° C. because its sublimation temperature is 100° C.

The reaction of phosphor pentafluoride and oxyfluoride shown in the formula (2) and the reaction of phosphor pentafluoride and lithium fluoride shown in the formula (3) depend on the temperature. The reaction develops easily if the temperature is high. However, as the temperature attains 250° C. or more, the counter-reaction as shown below will occur, increasing the content of lithium fluoride as impurity. FIG. 1 shows an example of differential thermal analysis of lithium hexafluorophosphate.

$$LiF + PF5 \leftrightarrow LiPF6 > 250° \text{ C.} \tag{4}$$

Though the reaction of phosphor pentafluoride with oxyfluoride, lithium fluoride proceeds sufficiently around the normal pressure, it is desirable that the reaction develops under the pressure. If the reaction system is put under the negative pressure, not only the reaction of phosphor pentafluoride with oxyfluoride, lithium fluoride proceeds hardly, but, on the contrary, lithium hexafluorophosphate decomposed increasing impurities. This is shown, in FIG. 2, by the relationship between free acid and insoluble residue by the inner pressure of the reaction system. Additionally, the time necessary for this generation reaction depends on conditions such as temperature or pressure, and the content of hydrogen fluoride, oxyfluoride and lithium fluoride in lithium hexafluorophosphate used for the generation, however several hours to a whole day and night are sufficient. When the purification reaction is completed, through dry nitrogen gas, remaining hydrogen fluoride, phosphor pentafluoride, hydrochloride, and non-reacted phosphoric chloride gas are purged completely.

Figure 1:
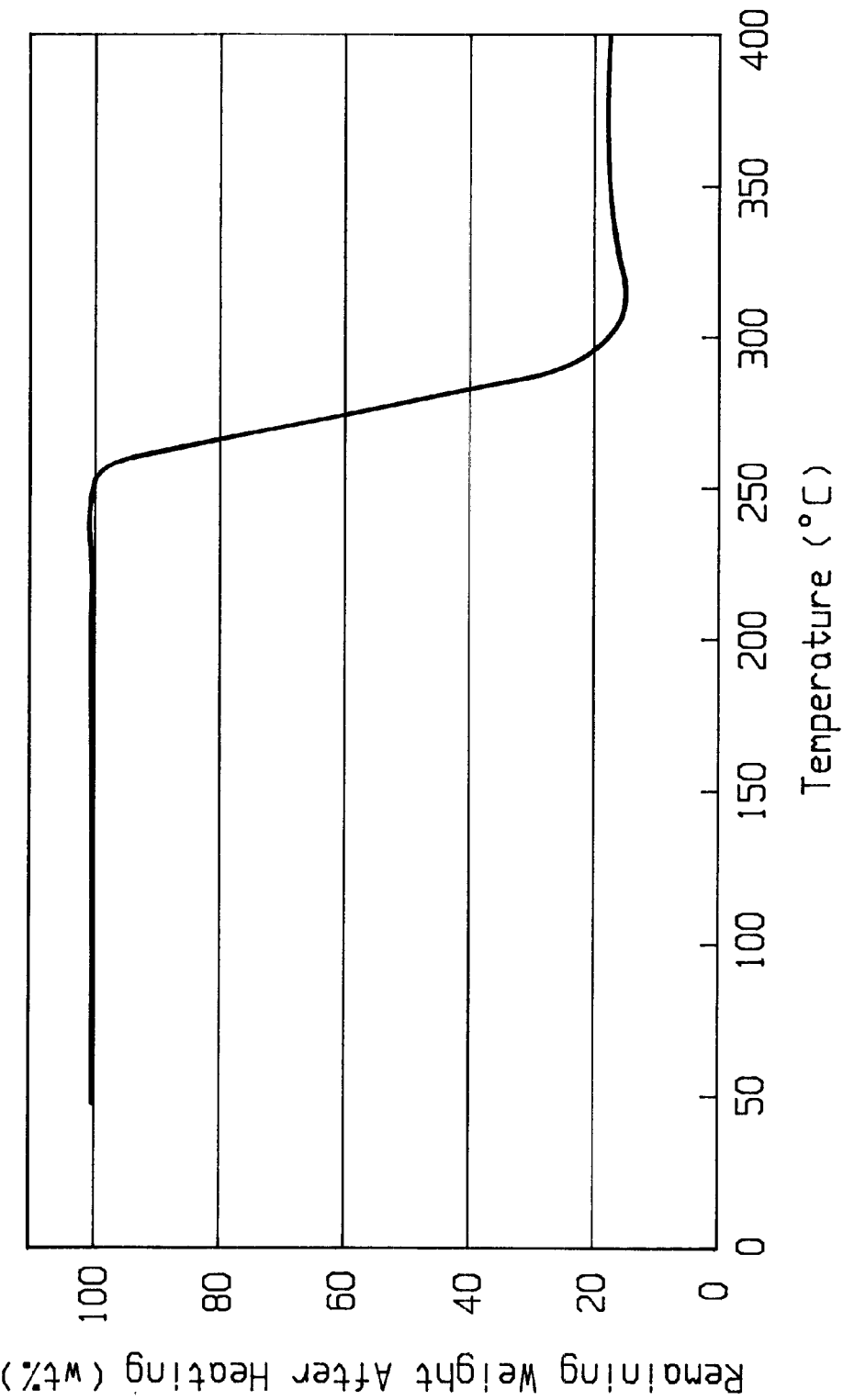
FIG. 1 is a graphic showing the results of differential thermal analysis of lithium hexafluorophosphate.
Figure 2:
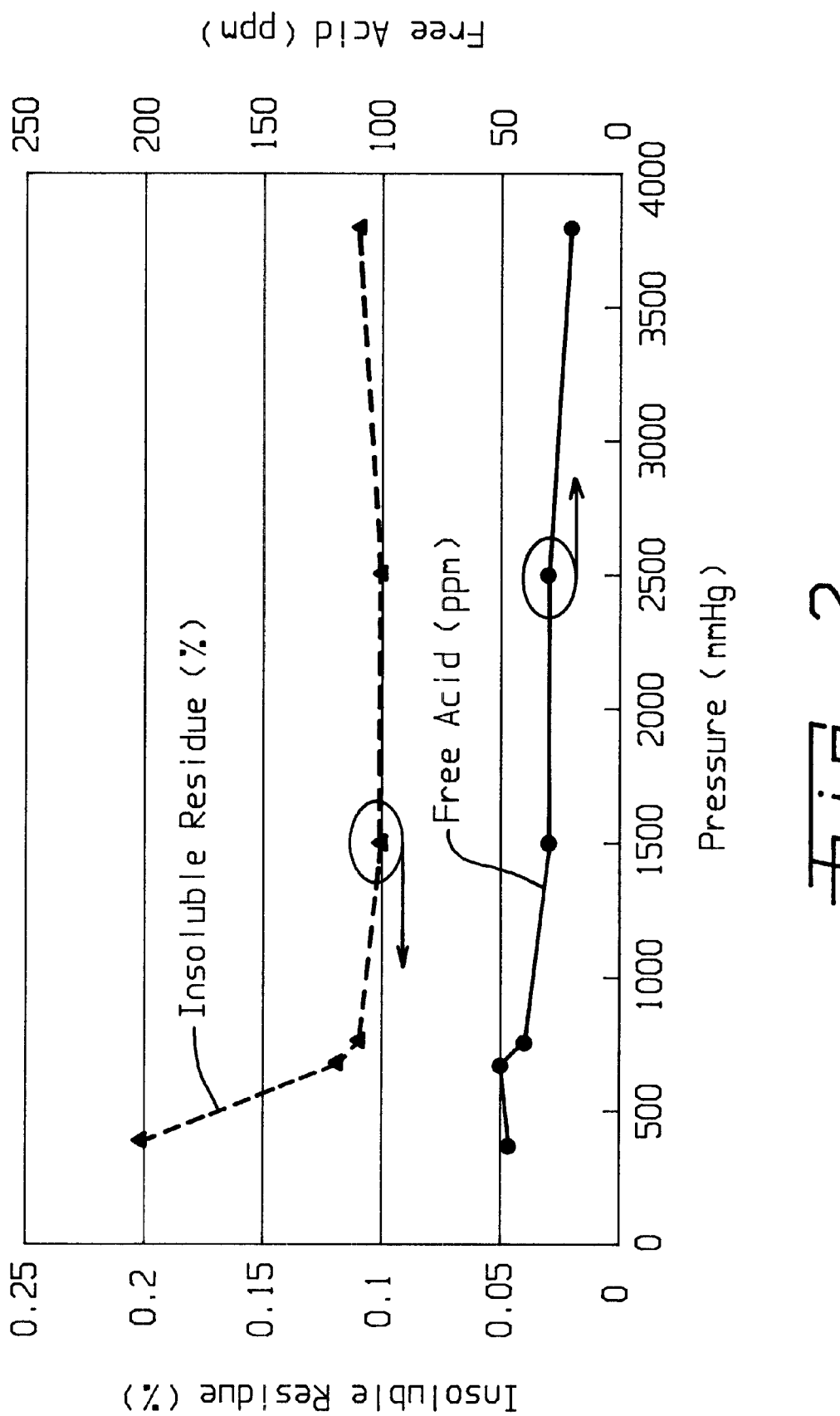
FIG. 2 is a graphic showing the relationship between inner pressure of the reaction system, free acid and insoluble residue.

BEST EMBODIMENTS OF THE INVENTION (Embodiment 1)

500 g of brut lithium hexafluorophosphate containing 4% of hydrogen fluoride, 50 ppm of oxyfluoride (LiPOF$_4$) and 0.13% of lithium fluoride is taken in a PFA vessel of 1 L, 5.5 g of phosphoric chloride is added thereto and mixed well, then the vessel is sealed with nitrogen gas flow, heated a whole night at 760 Torr, 105° C. for reaction. Remaining gas is purged by nitrogen gas to obtain purified lithium hexafluorophosphate. Impurities thereof is quantified to determine hydrogen fluoride 30 ppm, oxyfluoride 10 ppm or less and lithium fluoride 0.04%. Note that the stoichiometric amount of phosphoric chloride required for oxyfluoride and lithium fluoride being 5.3 g, it is added here by 1.0 time.

Comparative Example 1

500 g of brut lithium hexafluorophosphate containing 4% of hydrogen fluoride, 50 ppm of oxyfluoride (LiPOF$_4$) and 0.13% of lithium fluoride is taken in a PFA vessel of 1 L, 2.7 g of phosphoric chloride, about half of required amount for converting impurities into lithium hexafluorophosphate is added thereto and mixed well, then it is operated as in (Example 1) thereafter. Impurities in the obtained product thereof are quantified to determine hydrogen fluoride 50 ppm, oxyfluoride 30 ppm and lithium fluoride 0.08%, showing that impurities have been converted into lithium hexafluorophosphate rather insufficiently. Note that phosphoric chloride was added by half of the stoichiometric amount of the Embodiment 1.

(Embodiment 2)

500 g of brut lithium hexafluorophosphate containing 150 ppm of hydrogen fluoride and 4.0 g of lithium fluoride is taken in a PFA vessel of 1 L, 4.0 g of phosphoric chloride is added thereto and mixed well. Further, 2.0 g of liquid hydrogen fluoride corresponding to phosphoric chloride is added. The vessel is sealed with nitrogen gas flow, heated a whole night at 760 Torr, 105° C. for reaction. Remaining gas is purged by nitrogen gas to obtain purified lithium hexafluorophosphate. Impurities thereof is quantified to determine hydrogen fluoride 40 ppm and lithium fluoride 0.02%. Note that the stoichiometric amount of hydrogen fluoride for 4.0 g of phosphoric chloride is 1.9 g.

Comparative Example 2

500 g of brut lithium hexafluorophosphate containing 150 ppm of hydrogen fluoride and 0.10% of lithium fluoride is taken in a PFA vessel of 1 L, 4.0 g of phosphoric chloride is added thereto and mixed well. Further, phosphoric chloride and 0.9 g of liquid hydrogen fluoride, about half of the equivalent amount, are added thereto, and then it is operated as in (Example 2) thereafter. Impurities in the obtained product thereof are quantified to determine hydrogen fluoride 20 ppm and lithium fluoride 0.05%, showing that lithium fluoride was converted into lithium hexafluorophosphate insufficiently. Note that hydrogen fluoride was added by half of the stoichiometric amount of the Example 2.

(Embodiment 3)

1 kg of brut lithium hexafluorophosphate containing 0.5% of hydrogen fluoride and 0.11% of lithium fluoride is taken in a 3 L vessel made of SUS316, 9.0 g of phosphoric chloride is added thereto and mixed well. It is placed in a humidifier maintained at 200° C. and made react for 6 hours. At this moment, as the vessel inner pressure has increased, it is adjusted to more or less 1500 Torr. After completion of the reaction, the inner pressure is vented, and further gas remained inside is purged by nitrogen gas to obtain purified lithium hexafluorophosphate. Impurities thereof is analyzed to determine hydrogen fluoride 25 ppm and lithium fluoride 0.02%. Note that, in this Example, chemical equivalent amount of phosphoric chloride necessary for lithium fluoride is added.

Comparative Example 3

1 kg of brut lithium hexafluorophosphate containing 0.11% of hydrogen fluoride and 0.11% of lithium fluoride is taken in a 3 L vessel made of SUS316, 9.0 g of phosphoric chloride is added thereto and mixed well. It is placed in a humidifier maintained at 270 to 280° C. and made react for 6 hours. At this moment, as the vessel inner pressure has increased, it is adjusted to more or less 1500 Torr. Thereafter, it is operated as in (Embodiment 3). Impurities in the obtained lithium hexafluorophosphate are analyzed to determine hydrogen fluoride 20 ppm and lithium fluoride 0.2%. Lithium hexafluorophosphate has decomposed as the temperature was too high. Note that phosphoric chloride is added as much as Embodiment 3.

(Embodiment 4)

1 kg of brut lithium hexafluorqphosphate containing 0.5% of hydrogen fluoride and 0.11% of lithium fluoride is taken in a 3 L vessel made of SUS316, 9.0 g of phosphoric chloride is added thereto and mixed well. It is heated to 105° C. and made react for 10 hours. At this moment, the vessel inner pressure has attained 2500 Torr. After completion of the reaction, the inner pressure is vented, and further gas remained inside is purged by nitrogen gas to obtain purified lithium hexafluorophosphate. Impurities thereof is analyzed to determine hydrogen fluoride 20 ppm and lithium fluoride 0.01%. Note that stoichiometric amount of phosphoric chloride of the Example 3 is added.

Comparative Example 4

1 kg of brut lithium hexafluorophosphate containing 0.5% of hydrogen fluoride and 0.11% of lithium fluoride is taken in a 3 L vessel made of SUS316, 9.0 g of phosphoric chloride is added thereto and mixed well. It is heated to 105° C. and made react for 10 hours. At this moment, the vessel inner pressure has been lowered to 400 Torr by a vacuum pump. After completion of the reaction, nitrogen gas is blown inside. Impurities in the obtained lithium hexafluorophosphate are analyzed to determine hydrogen fluoride 20 ppm and lithium fluoride 0.26%. Lithium hexafluorophosphate has decomposed by decompression and heating. Note that stoichiometric amount of phosphoric chloride of the Example 3 is added.

INDUSTRIAL DOMAIN OF APPLICATION

The present invention allows to purify easily lithium hexafluorophosphate, useful as lithium secondary cell electrolyte or organic synthesis medium. It is characterized by that harmful impurities such as oxyfluoride and lithium fluoride or the like are made to react in the presence of phosphoric chloride and hydrofluoric acid euql or superior to the equivalent amount, and oxyfluoride and lithium fluoride are converted into lithium hexafluorophosphate by means of phosphor pentafluoride to be purified. The use of phosphoric chloride is cheap in cost, and the handling is easy as phosphoric chloride is solid. On the contrary, a method to refine lithium hexafluorophosphate to a high purity with gas containing phosphor pentafluoride involves danger as gas is handled directly, and requires specialized knowledge. Moreover, the production of high purity phosphor pentafluoride required for the purification costs extremely high.

According to the present invention, a great effect can be expected for producing cheaply and in quantity high purity lithium hexafluorophosphateby using phosphoric chloride in the course of purification.

What is claimed is:

1. A method of purifying lithium hexafluorosphate, wherein the purification is performed in the presence of phosphoric chloride and hydrogen fluoride of the quantity necessary for producing phosphor pentafluoride of the quantity more than necessary for converting rude lithium hexafluorophosphate and oxyfluoride in the raw material into lithium hexafluorophosphate in the reaction system with brut lithium hexafluorophosphate for their reaction.

2. The method of purifying lithium hexafluorosphate of claim 1, wherein the hydrogen fluoride used for the reaction is liquid and/or gas.

3. The method of purifying lithium hexafluorosphate of claim 1 or 2, wherein the reaction temperature is within the range from the room temperature to 250° C. or below.

4. The method of purifying lithium hexafluorosphate of one of claims 1 to 3, wherein the reaction pressure is equal or superior to 680 Torr.

5. The method of purifying lithium hexafluorosphate of claim 4, wherein the reaction pressure is 760 to 3800 Torr.

* * * * *